(12) United States Patent
Herrero

(10) Patent No.: US 10,015,097 B2
(45) Date of Patent: Jul. 3, 2018

(54) FAST ACCESS TELECOMMUNICATION TUNNEL CLONING

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 134 days.

(21) Appl. No.: 15/241,634

(22) Filed: Aug. 19, 2016

(65) Prior Publication Data

US 2018/0054388 A1 Feb. 22, 2018

(51) Int. Cl.
| | | |
|---|---|---|
| H04L 1/00 | (2006.01) | |
| H04L 12/803 | (2013.01) | |
| H04L 12/46 | (2006.01) | |
| H04L 29/06 | (2006.01) | |
| H04M 7/00 | (2006.01) | |

(52) U.S. Cl.
CPC ........ *H04L 47/122* (2013.01); *H04L 12/4633* (2013.01); *H04L 65/80* (2013.01); *H04L 69/169* (2013.01); *H04L 2212/00* (2013.01); *H04M 7/006* (2013.01)

(58) Field of Classification Search
CPC ... H04L 47/122; H04L 65/80; H04L 12/4633; H04L 69/169; H04L 2212/00; H04M 7/006
USPC .......................................................... 370/237
See application file for complete search history.

(56) References Cited

U.S. PATENT DOCUMENTS

| | | | |
|---|---|---|---|
| 2004/0223464 A1* | 11/2004 | Dye | ..................... H04L 12/1818 370/260 |
| 2010/0241732 A1* | 9/2010 | del Valle Lopez | ..... G06F 3/038 709/219 |
| 2011/0040888 A1* | 2/2011 | Krishnaswamy | ... H04L 63/0884 709/231 |
| 2013/0283037 A1 | 10/2013 | Katz et al. | |

(Continued)

FOREIGN PATENT DOCUMENTS

| | | |
|---|---|---|
| EP | 2826210 A1 | 1/2015 |
| EP | 2908491 A1 | 8/2015 |

OTHER PUBLICATIONS

H. Schulzrinne et al.; "RTP: A Transport Protocol for Real-Time Applications";Jul. 2003; 89 pages.

(Continued)

*Primary Examiner* — Faisal Choudhury
(74) *Attorney, Agent, or Firm* — Potomac Law Group, PLLC

(57) ABSTRACT

A system establishes a main tunnel between a tunneling client and a tunneling server using a first socket, the main tunnel including a corresponding tunnel identifier and Internet Protocol ("IP") address. The system traverses the encapsulated media over the main tunnel during the telecommunication session and then determines that a cloned tunnel is needed for the telecommunication session. The system establishes a cloned tunnel between the tunneling client and the tunneling server using a second socket that has been marked as a cloned tunnel candidate, where the cloned tunnel includes the corresponding tunnel identifier and IP address of the main tunnel. The system then traverses the encapsulated media over the cloned tunnel instead of the main tunnel during the telecommunication session.

20 Claims, 5 Drawing Sheets

(56) References Cited

U.S. PATENT DOCUMENTS

| | | | |
|---|---|---|---|
| 2014/0282957 A1* | 9/2014 | Thakore | H04L 63/0823 |
| | | | 726/7 |
| 2014/0379931 A1 | 12/2014 | Gaviria | |
| 2015/0039687 A1 | 2/2015 | Waxman et al. | |
| 2015/0043350 A1* | 2/2015 | Basilier | H04L 63/0272 |
| | | | 370/235 |
| 2015/0067819 A1* | 3/2015 | Shribman | H04L 67/06 |
| | | | 726/12 |
| 2015/0085664 A1 | 3/2015 | Sachdev et al. | |
| 2016/0095042 A1* | 3/2016 | Wadhwa | H04W 40/02 |
| | | | 370/328 |
| 2016/0112372 A1 | 4/2016 | Katz et al. | |
| 2016/0226815 A1* | 8/2016 | Wan | H04L 61/2007 |

OTHER PUBLICATIONS

3rd Generation Partnership Project; Technical Specification Group Services and System Aspects; Study on firewall traversal (Stage 2) (Release 12); 3GPP TR 33.830 Vo. 5.0 (Nov. 2013).

F. Wang et al.; "CloudJet4BigData: Streamlining Big Data via an accelerated socket interface"; the IEEE 3rd International Congress on big data (BigData 2014); Alaska; USA; Jun. 27-Jul. 2, 2014.

C. Mattmann et al.; "A Classification and Evaluation of Data Movement Technologies for the Delivery of Highly Voluminous Scientific Data Products"; Jet Propulsion Laboratory; California Institute of Technology; May 25, 2006.

\* cited by examiner

FAST ACCESS TELECOMMUNICATION TUNNEL CLONING

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that establishes a main tunnel between a tunneling client and a tunneling server using a first socket, the main tunnel including a corresponding tunnel identifier and Internet Protocol ("IP") address. The system traverses the encapsulated media over the main tunnel during the telecommunication session and then determines that a cloned tunnel is needed for the telecommunication session. The system establishes a cloned tunnel between the tunneling client and the tunneling server using a second socket that has been marked as a cloned tunnel candidate, where the cloned tunnel includes the corresponding tunnel identifier and IP address of the main tunnel. The system then traverses the encapsulated media over the cloned tunnel instead of the main tunnel during the telecommunication session.

DETAILED DESCRIPTION

One embodiment establishes a main telecommunication tunnel for encapsulated media or signaling traffic. During a telecommunication session (e.g., a voice call), upon detection of reduced quality or for any other reason, a second "cloned" tunnel is established, having an identical IP address and as the main tunnel, that may use a different transport layer as the main tunnel and that may connect to a different server as the main tunnel. The traffic is then moved to the second cloned tunnel.

Figure 1:
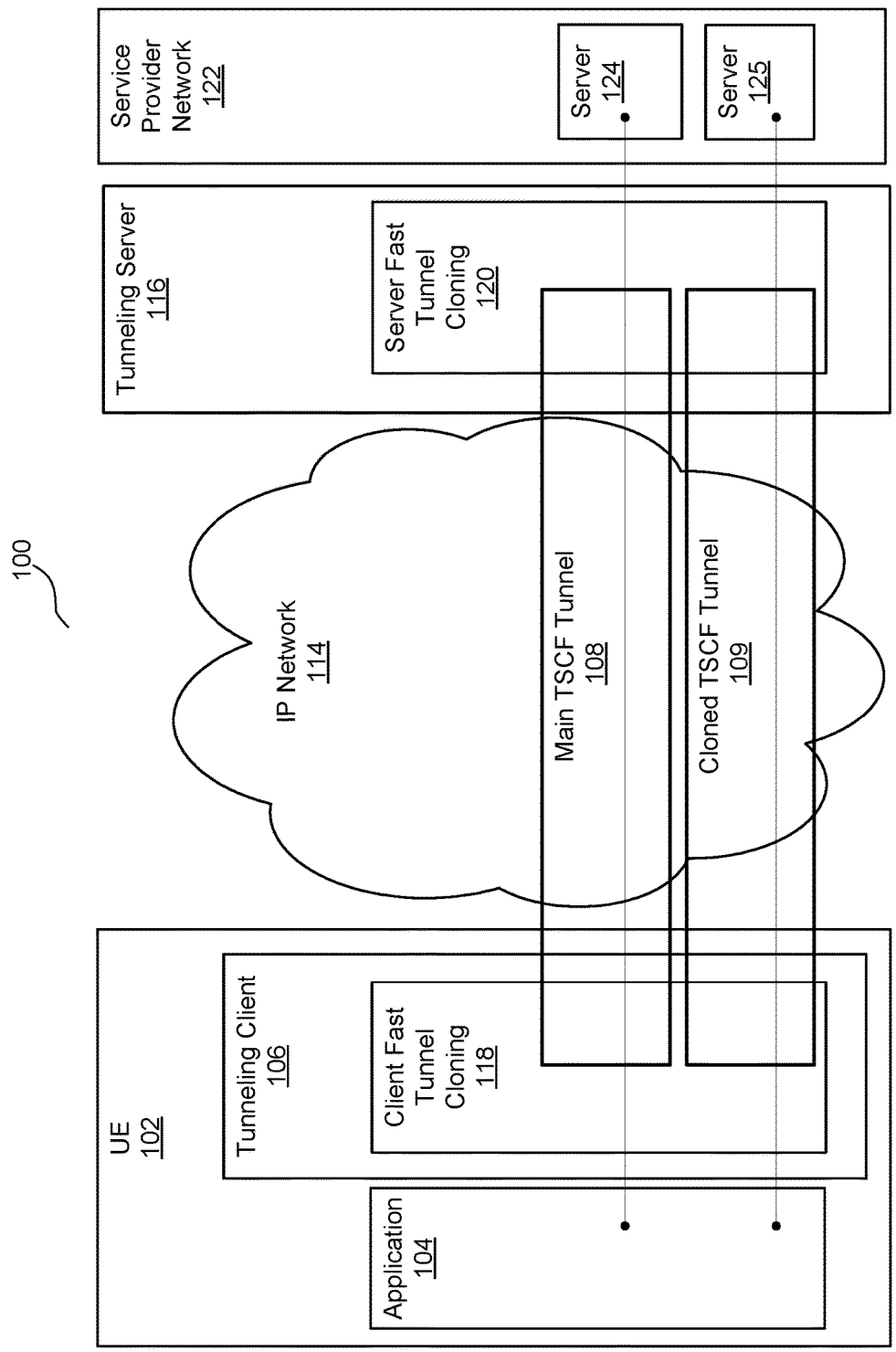
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124, 125 (additional servers may be included, not shown) in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a main TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116, and subsequently establishes a second cloned TSCF tunnel 109, as further described below.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communication network that experiences impairments. On the other hand, UDP and DTLS do not guarantee reliable delivery, thus minimizing latency and being desirable for RTC.

In some embodiments, IP network 114 may be a restrictive network in that it may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnels 108, 109 such that UE 102 may use them to traverse such security devices and connect to tunneling server 116 to reach servers 124, 125 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") or ("TID") assigned by tunneling server 116 to uniquely identify TSCF tunnel 108 (and subsequent cloned tunnels), and a "Sequence" field that is incremented per message, as described in, for example, 3GPP TR 33.830 V0.5.0.

In one embodiment, in order to establish main TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF ... ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client fast tunnel cloning module 118 and/or a server fast tunnel cloning module 120.

The SDKs in general provide additional APIs beyond "standard" TSCF APIs in order to implement the functionality disclosed herein. One embodiment provides TSCF SDKs that support an application programming interface ("API") so that application 104 can enable the fast tunnel cloning functionality. The TSCF SDK provides a Berkeley software distribution ("BSD")-like socket API that can be used to send and receive encapsulated media using the tsc_sendto and tsc_recvfrom functions, respectively.

Figure 2:
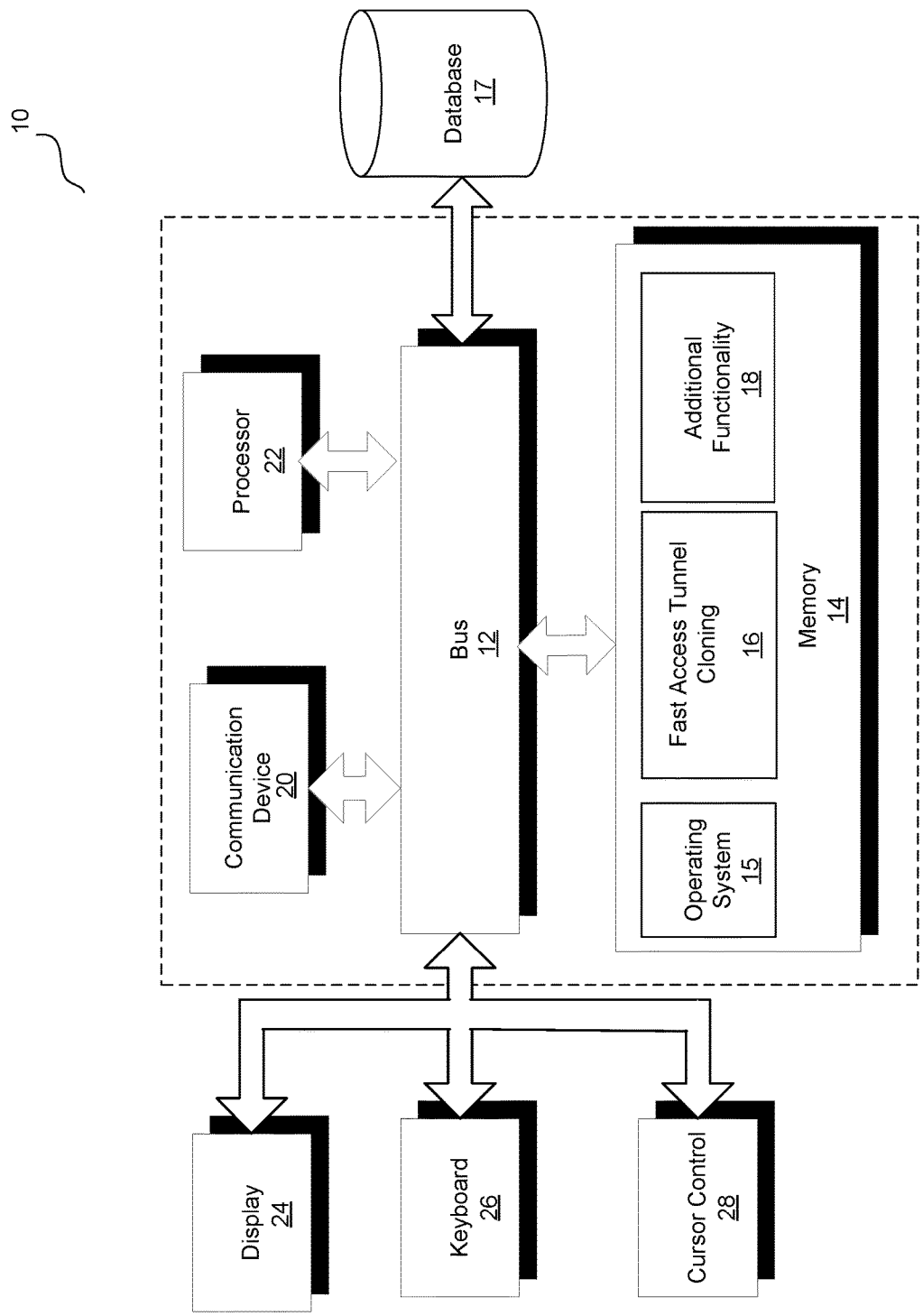
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22.

The modules include an operating system 15 that provides operating system functionality for system 10. The modules further include a fast access tunnel cloning module 16 for creating cloned tunnels for transporting encapsulated media traffic, and all other functionality disclosed herein. In one example embodiment, fast access tunnel cloning module 16 may implement tunneling server 116 of FIG. 1 or tunneling client 106 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for fast access tunnel cloning module 16 and additional functional modules 18.

Figure 3:
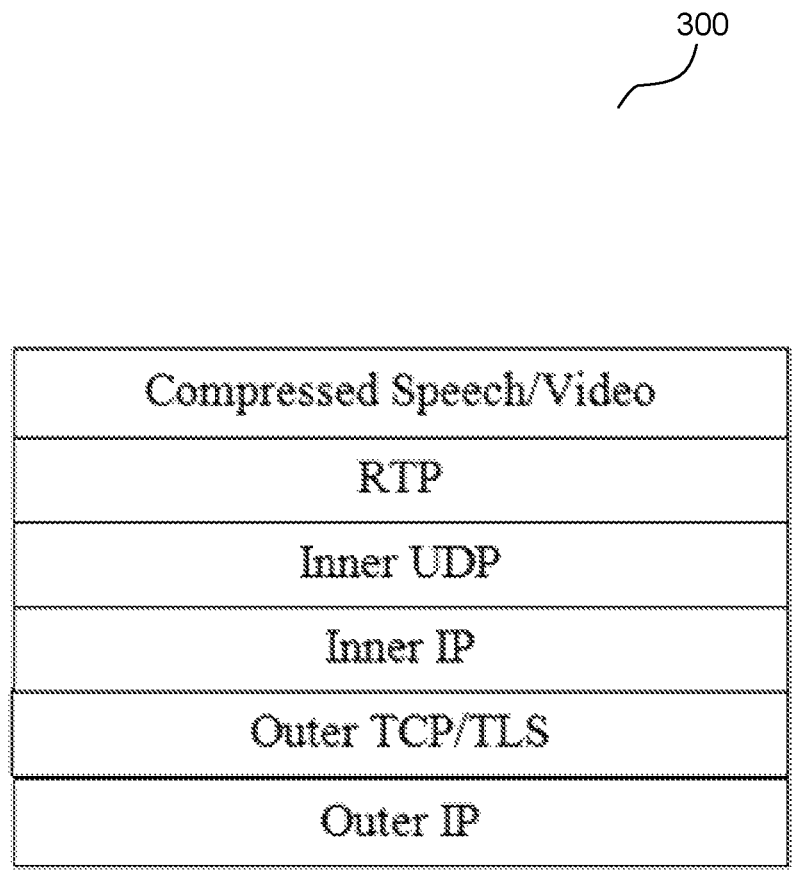
FIG. 3 illustrates example protocol layers in a Tunneled Services Control Function tunneling configuration for encapsulating media traffic according to an embodiment.

In a tunneling configuration, encapsulated (i.e., in a packet/frame) media is typically communicated according to the real-time transport protocol ("RTP" as provided, for example, in IETF RFC 3550). In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

To support low latency and reliable delivery of traffic, in certain situations it is desired to dynamically switch the transport type and/or the path of data associated with a given inner socket. For example, it is sometimes necessary for inner socket TCP based signaling traffic to follow a different path than inner socket TCP based instant messaging traffic. Known solutions provided for TSCF, such as Dynamic Datagram Tunnels ("DDT"), fail to address this problem for two reasons: (1) they are intended for media only; and (2) they rely on datagram transport only.

Referring again to FIG. 1, in order to provide mechanisms of low latency and reliable firewall traversal, as well as forward error correction ("FEC"), it may be necessary to establish or "clone" one or more additional tunnels (e.g., cloned tunnel 109) that, relying on different transport layer and path diversity, carry the same internal IP address as that of the main tunnel (e.g., main tunnel 108). To minimize packet loss and latency the cloned tunnels need to be established as fast as possible, and simultaneously be able to route traffic in an efficient way according to the needs of application 104. Therefore, embodiments include a transparent mechanism for dynamic main tunnel cloning based on transport and routing requirements.

In one embodiment, in order to implement, a new socket option is added to the "tsc_setsockopt" API to allow application 104 to enable a new transport by means of one or more cloned tunnel 109. The cloned tunnels in one embodiment have an internal IP address that is identical to that of main tunnel 108 and created upon socket binding.

In one embodiment, a new TSCF CM configuration request parameter is established to enable cloned tunnel creation. If a cloned tunnel cannot be established or until it is established, all traffic that belongs to its associated socket will traverse main tunnel 108. Further, server 116 and client 106 route traffic that belongs to specific sockets through their associated cloned tunnels.

In one embodiment, cloned tunnel 109 is terminated by the infrastructure as soon as their associated sockets are removed by application 104. Cloned tunnels 109 are terminated if main tunnel 108 is removed.

Figure 4:
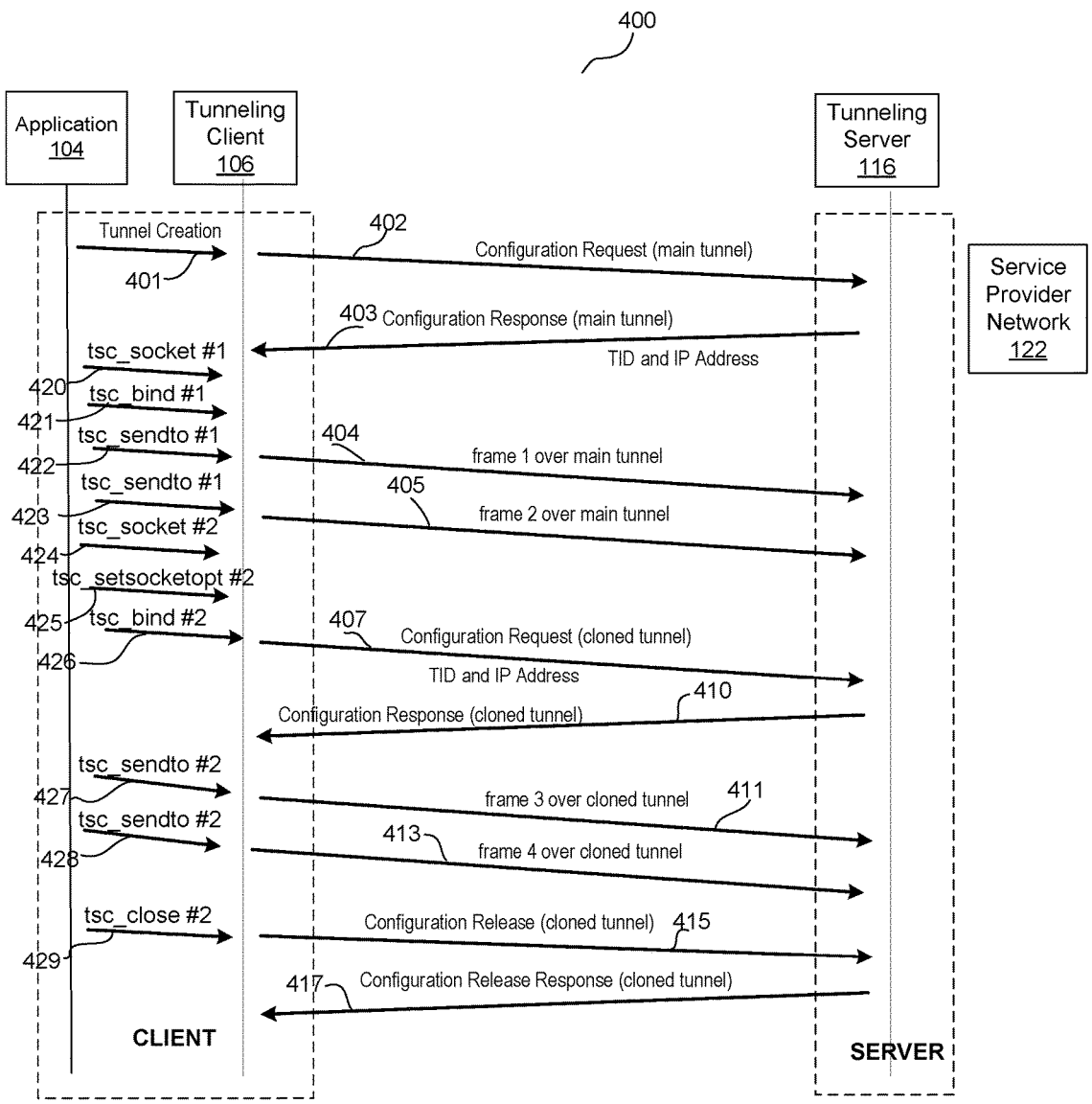
FIG. 4 includes network elements such as a tunneling client in communication with an application, and a tunneling server in communication with a service provider network, as described herein with reference to FIG. 1.

FIG. 4 is an example message sequence diagram 400, including the sequence of messages exchanged between application 104, tunneling client 106 and tunneling server 116 of FIG. 1, for fast access tunnel cloning according to some embodiments. FIG. 4 includes network elements such as tunneling client 106 in communication with application 104, and tunneling server 116 in communication with service provider network 122, as described herein with reference to FIG. 1.

In response to a tunnel creation request 401 from application 104, TSCF tunnel 108 (i.e., "main" tunnel) is established by executing a "tsc_ctrl_new_tunnel" API. Internally, tunneling client 106 generates a tunnel configuration request CM at 402 that is responded to by tunneling server 116 with a tunnel configuration response CM at 403, having a corresponding TID and IP address.

Application 104 then creates and binds socket #1 (i.e., a first socket) by executing a tsc_socket API at 420 and a tsc_bind API at 421.

Application 104 then calls a tsc_sendto API at 422 and 423 to send two frames (1 and 2) at 404, 405 using socket #1 over main tunnel 108.

At 424, application 104 creates socket #2 (i.e., a second socket) by executing a tsc_socket API and then marks socket #2 as a candidate for transport in a cloned tunnel by executing a tsc_setsockopt API at 425. Application 104 may create socket #2, and determine that a cloned tunnel is needed, based on many possible factors, including determining that the quality of an existing telecommunication session (e.g., a telephone call) using main tunnel 108 has sufficiently degraded. For example, using a measurement of packet loss, jitter, etc., the quality can be determined.

In one embodiment, degradation of the telecommunication session is measured through Medium Opinion Score ("MOS") values obtained by the TSCF infrastructure using probe packets that are looped back at the tunnel server. The mechanism measures latency, jitter and packet loss to calculate a quality score that is then reported to application 104. Application 104 can then use a cloned tunnel to improve communications.

At 426, application 104 binds socket #2 by calling a tsc_bind API. Internally, tunneling client 106 establishes a cloned tunnel 109 by generating a tunnel configuration request CM at 407 including a cloning request that is responded to by tunneling server 116 with a tunnel configuration response CM at 410. The established clone tunnel has the same corresponding TID and internal IP address as the main tunnel established at 402, 403. In one embodiment, the cloned tunnel is established without the use of TSCF service messages. TSCF service messages are a type of control message ("CM") that are used to enable services once a tunnel has been established.

Application 104 then calls a tsc_sendto API at 427 and 428 to send two frames (3 and 4) at 411, 413 using socket #2 over cloned tunnel 109. The frames can go to the same server in service provider network 122 (e.g., server 124) as the frames in the main tunnel, or can go to a different server as the frame in the main tunnel (e.g., main tunnel 108 frames go to server 124, and clone tunnel 109 frames go to server 125).

At 429, application 104 closes socket #2 by executing a tsc_close API at 429. Internally, tunneling client 106 generates a tunnel configuration release request CM at 415 that is responded to by tunneling server 116 with a tunnel configuration release response CM at 417.

As a result of the functionality of FIG. 4, embodiments allow for the creation of an unlimited number of cloned tunnels that rely on any transport type, such as a stream or datagram, and can access any preconfigured server that is part of service provider network 122, or located elsewhere. Therefore, embodiments allow for dynamically changing paths while maintaining inner layer parameters such as the internal IP address of main tunnel 108.

One embodiment supports fast access tunnel cloning by expanding TSCF to include a "clone" TLV value that is used to that is used indicate that the new tunnel is a clone of the main tunnel indicated in the TID of the configuration request CM (i.e., at 407 of FIG. 4).

Table 1 below provides an example TSCF TLV for providing fast access tunnel cloning functionality according to some embodiments.

TABLE 1

| TLV TYPE NAME | VALUE | SEMANTICS | SHORT/LONG FORMAT | VALUE TYPE | LENGTH |
|---|---|---|---|---|---|
| Clone | 54 | 0: original tunnel 1: cloned tunnel | Short | 8-bit number | 1 byte |

In one embodiment, if a given socket is to run traffic over a cloned tunnel, client application 104 sets the right option using the tsc_setsockopt API (i.e., at 425 of FIG. 4) as shown in the following pseudo-code.

```
int transport = TSC_NEW_TRANSPORT_UDP;
int result = tsc_setsockopt(socket, SOL_SOCKET, SO_TSC_NEW_TRANSPORT,
    (char *)&transport, sizeof(int));
``` where the "transport" variable above indicates the desired transport type of cloned tunnel 109 according to the following possible definitions in one embodiment, where the transport types are either UDP or TCP:

```
#define TSC_NEW_TRANSPORT_UDP 0
#define TSC_NEW_TRANSPORT_TCP 1
```

If "tsc_setsockopt" returns −1 the option was not set correctly. If it returns 0 it was set correctly but the functionality is not active until the cloned tunnel is negotiated. A new notification "tsc_notification_new_transport" can be used to notify the client about this activation. The following pseudo-code shows how the notification is enabled and what the notification callback function looks like:

```
tsc_notification_enable(handle, tsc_notification_new_transport, new_transport_notification, NULL);
void new_transport_notification(tsc_notification_data *notification)
{
  tsc_notification_new_transport_info_data *new_transport_data = (tsc_notification_new_transport
(info_data *)notification->data;
  if (new_transport_data && new_transport_data->available == tsc_bool_true) {
    if (new_transport_data->enabled == tsc_bool_true) {
      printf("new transport enabled notification on socket %d\n", new_transport_data->socket);
    } else {
      printf("new transport notification playing on socket %d\n", new_transport_data->socket);
    }
  } else {
    printf("new transport notification not allowed on socket %d\n", new_transport_data->socket);
  }
}
```

The fourth NULL parameter in "tsc_notification_enable" is an opaque/private data pointer that can be recovered in the "tsc_notification_data" structure upon callback.

One embodiment that is implemented using an SBC, such as the Acme Packet 6300 from Oracle Corp., provides a configuration object "tscf-interface" that includes a parameter "assigned-services" that includes a keyword "cloned_tunnels". Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: Blank | cloned_tunnels to enable cloned tunnels | Optional |

The following functionality provides an example interface configuration for providing fast access tunnel cloning according to one embodiment.

```
tscf-interface
    realm-id                access
    state                   enabled
    max-tunnels             1000
    local-address-pools     Ip
    assigned-services       SIP, cloned_tunnels
    tscf-port
        address             192.168.1.100
        port                4888
        transport-protocol  TCP
        tls-profile
        rekey-profile
```

The following is an example extensible markup language ("XML") functionality for providing fast access tunnel cloning according to one embodiment:

```
<tscfInterface realmID='access'
    state='enabled'
    maxTunnels='1000'
    assignedServices='SIP,cloned_tunnels
    options=''
    lastModifiedBy='admin@console'
    lastModifiedDate='2015-01-05 05:01:10'
    objectId='33'>
    <key>access</key>
    <localAddressPool name='Ip'/>
    <tscfPort address=192.168.1.100
        port='4888'
        transProtocol='TCP'
        tlsProfile=''
        rekeyProfile=''
</tscfInterface>
```

Figure 5:
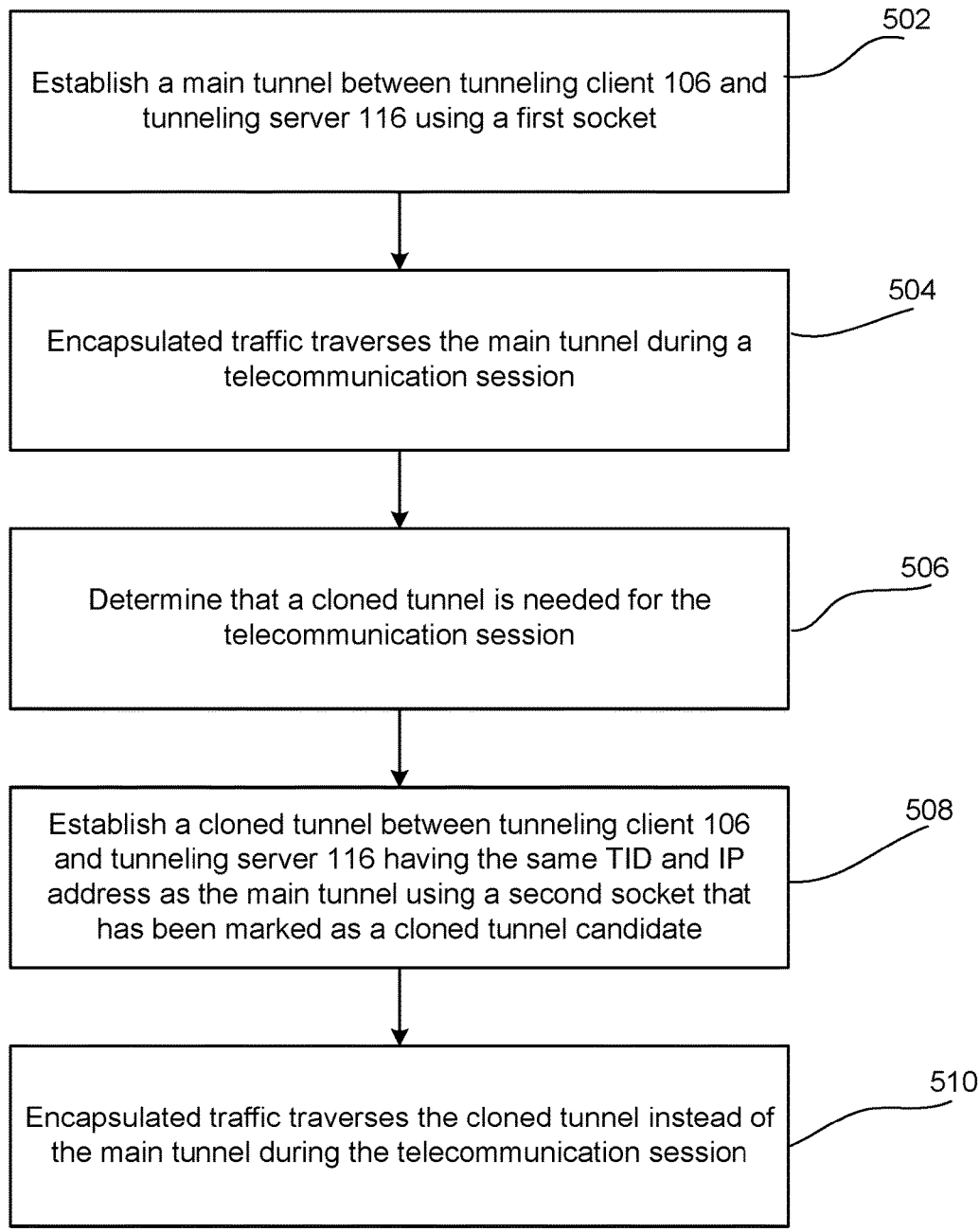
FIG. 5 is a flow diagram of a fast access tunnel cloning module of FIG. 2 and/or a tunneling client and a tunneling server of FIG. 1 when creating cloned tunnels for transporting encapsulated media traffic in accordance with embodiments of the present invention.

FIG. 5 is a flow diagram of fast access tunnel cloning module 16 of FIG. 2 and/or tunneling client 106 and tunneling server 116 of FIG. 1 when creating cloned tunnels for transporting encapsulated media traffic in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, for a telecommunication session, a main tunnel is established between tunneling client 106 and tunneling server 116 using a first socket. In one embodiment, the main tunnel is a TSCF based tunnel that has a corresponding tunnel ID and IP address.

At 504, encapsulated media traverses the main tunnel. In another embodiment, other types of data such as signaling traffic may traverse the main tunnel.

At 506, application 104 determines that a cloned tunnel is needed. For example, a measurement of a quality of a session involving the encapsulated media of 504 may move below a predetermined threshold (e.g., a voice call has degraded, and as a result the cloned tunnel is established in the middle of the voice call). Tunneling server 116 or tunneling client 106 can also determine if a cloned tunnel is needed by receiving a determination from application 104.

At 508, using a second socket that has been marked as a cloned tunnel candidate, a cloned tunnel is established between tunneling client 106 and tunneling server 116. In one embodiment, the cloned tunnel is a TSCF based tunnel that has the same corresponding tunnel ID and IP address as the main tunnel of 502. The cloned tunnel may have a different transport layer as the main tunnel (e.g., UDP instead of TCP), and the data in the frames may go to a different server of the service provider network as the main tunnel. For example, each tunnel (e.g., main tunnel 108 and cloned tunnel 109) may terminate at two different interfaces (e.g., tunnel servers 124, 125) that propagate the information down the network to the untunneled side. Since each tunnel server is associated to a different interface they are also associated to different networks with different impairments.

In one embodiment, the cloned tunnel is established without the use of TSCF service messages. In one embodiment, a second, different server is first determined and then the corresponding second socket is selected. In one embodiment the cloned tunnel has the same inner layer of the main tunnel and a different outer layer. For example, two application sockets #1 and #2 that run UDP traffic can be transported on two different tunnels. Traffic of socket #1 may be in a TCP transport tunnel and traffic of socket #2 may be in a UDP transport tunnel. For example, in one embodiment, socket #1 has the following four layers: outer IP+outer TCP+inner IP+inner UDP, and socket #2 has the following four layers: outer IP+outer UDP+inner IP+inner UDP.

At 510, additional encapsulated media traverses the cloned tunnel instead of the main tunnel for the telecommunication session.

As disclosed, for a telecommunication session, a main tunnel is established using a first socket. As some point during the session due to, for example, degraded quality, a cloned tunnel is established using a second socket that is marked for a cloned tunnel. The cloned tunnel has the same tunnel ID and IP address as the main tunnel. The cloned tunnel is then used for transporting encapsulated media instead of the main tunnel.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of transmitting encapsulated media during a telecommunication session, the method comprising:

establishing a main tunnel between a tunneling client and a tunneling server using a first socket, the main tunnel comprising a corresponding tunnel identifier and Internet Protocol (IP) address;

initially traversing the encapsulated media over the main tunnel during the telecommunication session;

determining that a cloned tunnel is needed for the telecommunication session based on a detection of a degradation of the telecommunication session over the main tunnel;

establishing a cloned tunnel between the tunneling client and the tunneling server using a second socket that has been marked as a cloned tunnel candidate, wherein the cloned tunnel comprises the corresponding tunnel identifier and IP address of the main tunnel; and after establishing the cloned tunnel, traversing the encapsulated media over the cloned tunnel instead of the main tunnel during the telecommunication session.

2. The method of claim 1, wherein the main tunnel and the cloned tunnel are established according to a tunneled services control function (TSCF) standard.

3. The method of claim 1, wherein the main tunnel terminates at a first interface associated with a first server at a service provider network and the cloned tunnel terminates at a second interface associated with a second server at the service provider network that is different than the first server.

4. The method of claim 2, wherein the cloned tunnel is established without a use of TSCF service messages.

5. The method of claim 1, wherein the main tunnel and the cloned tunnel comprise one of either a Transmission Control Protocol (TCP) transport or a User Datagram Protocol (UDP) transport.

6. The method of claim 1, wherein the main tunnel and the cloned tunnel comprise a same inner layer and a different outer layer.

7. The method of claim 1, further comprising traversing signaling traffic over the cloned tunnel instead of the main tunnel.

8. The method of claim 1, wherein the detection of the degradation is based on a measurement of at least one of packet loss, jitter or latency.

9. A non-transitory computer readable medium having instructions stored thereon that, when executed by a processor, cause the processor to transmit encapsulated media during a telecommunication session, the transmitting comprising:

establishing a main tunnel between a tunneling client and a tunneling server using a first socket, the main tunnel comprising a corresponding tunnel identifier and Internet Protocol (IP) address;

initially traversing the encapsulated media over the main tunnel during the telecommunication session;

determining that a cloned tunnel is needed for the telecommunication session based on a detection of a degradation of the telecommunication session over the main tunnel;

establishing a cloned tunnel between the tunneling client and the tunneling server using a second socket that has been marked as a cloned tunnel candidate, wherein the cloned tunnel comprises the corresponding tunnel identifier and IP address of the main tunnel; and after establishing the cloned tunnel, traversing the encapsulated media over the cloned tunnel instead of the main tunnel during the telecommunication session.

10. The computer readable medium of claim 9, wherein the main tunnel and the cloned tunnel are established according to a tunneled services control function (TSCF) standard.

11. The computer readable medium of claim 9, wherein the main tunnel terminates at a first interface associated with a first server at a service provider network and the cloned tunnel terminates at a second interface associated with a second server at the service provider network that is different than the first server.

12. The computer readable medium of claim 10, wherein the cloned tunnel is established without a use of TSCF service messages.

13. The computer readable medium of claim 9, wherein the main tunnel and the cloned tunnel comprise one of either a Transmission Control Protocol (TCP) transport or a User Datagram Protocol (UDP) transport.

14. The computer readable medium of claim 9, wherein the main tunnel and the cloned tunnel comprise a same inner layer and a different outer layer.

15. The computer readable medium of claim 9, the transmitting further comprising traversing signaling traffic over the cloned tunnel instead of the main tunnel.

16. The computer readable medium of claim 9, wherein the detection of the degradation is based on a measurement of at least one of packet loss, jitter or latency.

17. A user equipment device comprising:

a processor coupled to a storage device that stores instructions, the processor executing the instructions to implement an application and a tunneling client;

the tunneling client configured to establish a main tunnel between a tunneling client and a tunneling server using a first socket, the main tunnel comprising a corresponding tunnel identifier and Internet Protocol (IP) address;

the tunneling client configured to initially traverse encapsulated media over the main tunnel during a telecommunication session;

the application configured to determining that a cloned tunnel is needed for the telecommunication session based on a detection of a degradation of the telecommunication session over the main tunnel;

the tunneling client configured to establish a cloned tunnel between the tunneling client and the tunneling server using a second socket that has been marked as a cloned tunnel candidate, wherein the cloned tunnel comprises the corresponding tunnel identifier and IP address of the main tunnel; and the tunneling client configured to, after establishing the cloned tunnel, traverse the encapsulated media over the cloned tunnel instead of the main tunnel during the telecommunication session.

18. The user equipment device of claim 17, wherein the main tunnel and the cloned tunnel are established according to a tunneled services control function (TSCF) standard.

19. The user equipment device of claim 17, wherein the main tunnel terminates at a first interface associated with a first server at a service provider network and the cloned tunnel terminates at a second interface associated with a second server at the service provider network that is different than the first server.

20. The user equipment device of claim 18, wherein the cloned tunnel is established without a use of TSCF service messages.

* * * * *